(12) United States Patent
Zhao

(10) Patent No.: US 6,687,054 B2
(45) Date of Patent: Feb. 3, 2004

(54) APPARATUS AND METHOD FOR LOW DISPERSION IN COMMUNICATIONS

(75) Inventor: Bin Zhao, Irvine, CA (US)

(73) Assignee: Cirvine Corporation, Irvine, CA (US)

( * ) Notice: Subject to any disclaimer, the term of this patent is extended or adjusted under 35 U.S.C. 154(b) by 257 days.

(21) Appl. No.: 09/876,647

(22) Filed: Jun. 7, 2001

(65) Prior Publication Data

US 2001/0053025 A1 Dec. 20, 2001

Related U.S. Application Data

(60) Provisional application No. 60/210,049, filed on Jun. 7, 2000, provisional application No. 60/210,052, filed on Jun. 7, 2000, and provisional application No. 60/213,369, filed on Jun. 23, 2000.

(51) Int. Cl.[7] ......................... G02B 27/28; H04B 10/00; H04J 14/02
(52) U.S. Cl. .................. 359/495; 359/497; 359/498; 359/499; 398/65; 398/68; 398/79; 398/81
(58) Field of Search ......................... 359/499, 498, 359/497

(56) References Cited

U.S. PATENT DOCUMENTS

| 4,247,166 | A |   | 1/1981  | Yeh |         |
|-----------|---|---|---------|-----|---------|
| 4,500,178 | A |   | 2/1985  | Yeh |         |
| 4,548,479 | A |   | 10/1985 | Yeh |         |
| 4,678,287 | A | * | 7/1987  | Buhrer | 359/497 |
| 4,772,104 | A | * | 9/1988  | Buhrer | 359/497 |
| 4,988,170 | A | * | 1/1991  | Buhrer | 359/497 |
| 5,062,694 | A |   | 11/1991 | Bair | 359/498 |
| 5,471,340 | A |   | 11/1995 | Cheng et al. | 359/281 |
| 5,574,596 | A |   | 11/1996 | Cheng | 359/484 |
| 5,606,439 | A |   | 2/1997  | Wu | 349/117 |
| 5,682,446 | A |   | 10/1997 | Pan et al. | 385/11 |
| 5,694,233 | A |   | 12/1997 | Wu et al. | 359/117 |
| 5,724,165 | A |   | 3/1998  | Wu | 359/117 |
| 5,818,981 | A |   | 10/1998 | Pan et al. | 385/11 |
| 5,867,291 | A |   | 2/1999  | Wu et al. | 359/124 |
| 5,929,946 | A | * | 7/1999  | Sharp et al. | 349/106 |
| 5,978,116 | A |   | 11/1999 | Wu et al. | 359/124 |
| 6,005,697 | A |   | 12/1999 | Wu et al. | 359/117 |
| 6,049,367 | A | * | 4/2000  | Sharp et al. | 349/117 |
| 6,049,427 | A |   | 4/2000  | Bettman | 359/484 |
| 6,301,046 | B1 | * | 10/2001 | Tai et al. | 359/498 |
| 6,342,968 | B1 | * | 1/2002  | Tai et al. | 359/497 |
| 6,393,039 | B1 | * | 5/2002  | Damask et al. | 359/498 |
| 6,396,609 | B1 | * | 5/2002  | Cheng et al. | 398/158 |
| 6,441,960 | B1 | * | 8/2002  | Wang et al. | 359/497 |
| 2001/0053022 | A1 | * | 12/2001 | Tai et al. | 359/484 |

OTHER PUBLICATIONS

Alan M. Title, "Improvement of Birefringent Filters. 2: Achromatic Waveplates", Applied Optics, vol. 14, No. 1, pp. 229–237, Jan. 1975.*
T.A. Vinogradova–Smirnova, "Controllable Dispersion Interference—Polarization Filters", Optics and Spectroscopy, vol. 32, No. 1, pp. 92–94, Jan. 1972.*
T.A. Vinogradova, "Multicomponent Dispersive Interference—Polarization Filters", Optics and Spectroscopy, vol. 29, No. 2, pp. 209–211, Aug. 1970.*

(List continued on next page.)

Primary Examiner—John Juba
(74) Attorney, Agent, or Firm—Rutan & Tucker

(57) ABSTRACT

A low dispersion comb filter or interleaver assembly has a first interleaver element and a second interleaver element. The first interleaver element is configured so as to provide a dispersion vs. wavelength curve wherein each dispersion value thereof is approximately opposite in value to a dispersion value at the same wavelength for the second interleaver element, so as to mitigate net or total dispersion in the interleaver assembly.

3 Claims, 10 Drawing Sheets

OTHER PUBLICATIONS

Pages 10–29 from book believed to be entitled *Electromagnetic Theory*. No further information on book is available.

Carl F. Buhrer; *Synthesis and tuning of high–order Solc–type birefringent filters, Applied Optics,* Apr. 20, 1994, vol. 33, No. 12, pp. 2249–2254.

Tatsuya Kimura, Masatoshi Saruwatari; *Temperature Compensation of Birefringent Optical Filters; Proceeding Letters,* Aug. 1971, pp. 1273–1274 Proc. IEEE.

Carl F. Buhrer; *Four waveplate dual tuner for birefringent filters and multiplexers; Applied Optics,* Sep. 1, 1987, vol. 26, No. 17, pp. 3628–3632.

P. Melman, W.J. Carlsen, B. Foley; *Tunable Birefringent Wavelength–Division Multiplexer/Demultiplexer, Electronics Letters,* Jul. 18, 1985, vol. 21, No. 15, pp. 634 and 635.

Yohji Fujii; *Tunable wavelength multi/demultiplexer using a variable retardation phase plate; Applied Optics,* Aug. 20, 1990, vol. 29, No. 29 pp. 3465–3467.

S.E. Harris, E.O. Ammann, I. C. Chang; *Optical Network Synthesis Using Birefringent Crystals. I. Synthesis of Lossless Networks of Equal–Length Crystals, Journal of the Optical Society of America,* Oct. 1964, vol. 564, No. 10, pp. 1267–1279.

Tatsuya Kimura, Masatoshi Saruwatari, and Kenju Otsuka; *Birefringent Branching Filters for Wideband Optical FDM Communications; Applied Optics,* Feb. 1973, vol. 12, No. 2, pp. 373 to 379.

Godfrey R. Hill; *Wavelength Domain Optical Network Techniques; Proceedings of the IEEE,* Jan. 1989, vol. 77, No. 1, pp. 121 to 132.

J. M. Senior, S.D. Cusworth; *Devices for Wavelength Multiplexing and Demultiplexing; IEE Proceedings,* Jun. 1989, vol. 136, Pt. J. No. 3, pp. 183–202.

\* cited by examiner

APPARATUS AND METHOD FOR LOW DISPERSION IN COMMUNICATIONS

CROSS-REFERENCE TO RELATED APPLICATIONS

This patent application claims the benefit of the filing date of U.S. Provisional Patent Application Serial No. 60/210,049, filed on Jun. 7, 2000, and entitled LOW CROSSTALK FLAT BAND FILTER, United States Provisional Patent Application No. 60/210,052, filed on Jun. 7, 2000 and entitled METHOD AND APPARATUS FOR LOW DISPERSION IN HIGH BIT RATE COMMUNICATIONS and U.S. Patent Application No. 60/213,369, filed on Jun. 23, 2000 and entitled METHOD AND APPARATUS FOR DISPERSION COMPENSATION IN HIGH BIT RATE COMMUNICATIONS, the entire contents of all of which are hereby expressly incorporated by reference.

This patent application is related to patent application Ser. No. 09/876,484, filed on Jun. 7, 2001 entitled LOW CROSSTALK FLAT BAND FILTER (allowed); patent application Ser. No. 09/876,602, filed on Jun. 7, 2001 entitled BIREFRINGENT DEVICES (pending); patent application Ser. No. 09/876,368, filed on Jun. 7, 2001 entitled INTERLEAVER USING SPATIAL BIREFRINGENT ELEMENTS (pending); and patent application Ser. No. 09/876,819, filed on Jun. 7, 2001 entitled COMB FILTER FOR DENSE WAVELENGTH DIVISION MULTIPLEXING (abandoned); all filed on the instant date herewith and commonly owned by the Assignee of this patent application, the entire contents of all which are hereby expressly incorporated by reference.

FIELD OF THE INVENTION

The present invention relates generally to optical communications devices and systems and relates more particularly to a low dispersion filter or interleaver for use in wavelength division multiplexing (WDM) and dense wavelength division multiplexing (DWDM) optical communication systems and the like.

BACKGROUND OF THE INVENTION

Optical communication systems which utilize wavelength-division multiplexing (WDM) and dense wavelength division multiplexing (DWDM) technologies are well known. According to both wavelength-division multiplexing and dense wavelength-division multiplexing, a plurality of different wavelengths of light, typically infrared light, are transmitted via a single medium such as an optical fiber. Each wavelength corresponds to a separate channel and carries information generally independently with respect to the other channels. The plurality of wavelengths (and consequently the corresponding plurality of channels) are transmitted simultaneously without interference with one another, so as to substantially enhance the transmission bandwidth of the communication system. Thus, according to wavelength-division multiplexing and dense wavelength-division multiplexing technologies, a much greater amount of information may be transmitted than is possible utilizing a single wavelength optical communication system.

The individual channels of a wavelength-division multiplexed or dense wavelength-division multiplexed signal must be selected or separated from one another at a receiver in order to facilitate detection and demodulation thereof. This separation or demultiplexing process can be performed by an interleaver. A similar device facilitates multiplexing of the individual channels by a transmitter.

It is important that the interleaver separate the individual channels sufficiently so as to mitigate undesirable crosstalk therebetween. Crosstalk occurs when channels overlap, i.e., remain substantially unseparated, such that some portion of one or more non-selected channels remains in combination with a selected channel. As those skilled in the art will appreciate, such crosstalk interferes with the detection and/or demodulation process. Typically, the effects of crosstalk must be compensated for by undesirably increasing channel spacing and/or reducing the communication speed, so as to facilitate reliable detection/demodulation of the signal.

However, as channel usage inherently increases over time, the need for efficient utilization of available bandwidth becomes more important. Therefore, it is highly undesirable to reduce communication speed in order to compensate for the effects of crosstalk. Moreover, it is generally desirable to reduce channel spacing so as to facilitate the communication of a greater number of channels.

Filters are typically used within interleavers (and are also used in various other optical devices), so as to facilitate the separation of channels from one another in a wavelength-division multiplexing or dense wavelength division multiplexing system. Various characteristics of such filters contribute to the mitigation of crosstalk and thus to contribute reliable communications. For example, the ability of a filter to separate one optical channel from another or to separate one set of channels from another set of channels is dependent substantially upon width and depth of the filter's stopband. Generally, the wider and deeper the stopband, the more effectively the filter rejects unwanted adjacent channels and thus the more effectively the filter mitigates crosstalk.

Further, the flatness and width of the filter's passband is important. The flatness of the filter's passband determines how much the signal is undesirably altered during the filtering process. A substantially flat passband is desired, so as to assure that minimal undesirable alteration of the signal occurs. The width of the passband determines how far from the ideal or nominal channel center frequency a signal can be and still be effectively selected. A wide passband is desirable because the nominal center frequency of a carrier which is utilized to define a communication channel is not perfectly stable, and therefore tends to drift over time. Further, the nominal center frequency of a filter passband likewise tends to drift over time. Although it is possible to construct a system wherein the center frequency of the communication channel and the center frequency of the filter are comparatively stable, it is generally impractical and undesirably expensive to do so.

Although having a wider filter passband is generally desirable, so as to facilitate the filtering of signals which have drifted somewhat from their nominal center wavelength, the use of such wider pass bands and the consequent accommodation of channel center wavelength drift does introduce the possibility for undesirably large dispersion being introduced into a filtered channel. Typically, the dispersion introduced by a birefringent filter or interleaver increases rapidly as the channel spacing is reduced and as a channel moves away from its nominal center wavelength, as discussed in detail below. Thus, as more channel wavelength error is tolerated in a birefringent filter or interleaver, greater dispersion values are likely to be introduced.

In order to construct a system wherein the center frequency of the communication channel and the center frequency of the filter are comparatively stable, it is necessary to provide precise control of the manufacturing processes involved. Since it is generally impractical and undesirably expensive to provide such precise control during manufacturing, the center frequency of communication channels and the center frequency of filters generally tend to mismatch with each other. Precise control of manufacturing processes is difficult because it involves the use of more stringent tolerances which inherently require more accurate manufacturing equipment and more time consuming procedures. The center frequency of the communication channel and the center frequency of the filter also tend to drift over time due to inevitable material and device degradation over time and also due to changes in the optical characteristics of optical components due to temperature changes. Therefore, it is important that the passband be wide enough so as to include a selected signal, even when both the carrier frequency of the selected signal and the center frequency of the passband are not precisely matched or aligned during manufacturing and have drifted substantially over time.

Birefringent filters for use in wavelength-division multiplexing and dense wavelength-division multiplexing communication systems are well known. Such birefringent filters are used to select or deselect optical signals according to the channel wavelengths thereof. However, contemporary birefringent filters tend to suffer from deficiencies caused by inherent carrier and passband instability due to manufacturing difficulties and due to drifting over time, as discussed above. That is, the passband of a contemporary birefringent filter is not as flat or as wide as is necessary for optimal performance. Further, the stopbands of such contemporary birefringent filters are not as deep or as wide as is necessary for optimal performance. Third, it typically has large dispersion which would introduce significant signal distortion. Therefore, it is desirable to optimize such birefringent filters in a manner which enhances the width of the passband, makes the passband more flat, and which also widens and deepens the stopband. It is desirable to provide a birefringent filter whereby the width of the stopband is roughly equal to the width of the passband, so as to facilitate the efficient separation of equally spaced channels in a wavelength-division multiplexing or dense wavelength-division multiplexing communication system. Further, it is desirable to provide a birefringent filter which possess zero or extremely low dispersion.

Such birefringent filters typically comprise a plurality of birefringent elements placed end-to-end between two polarization selection devices, so as to define a contemporary Solc-type optical filter.

Referring now to FIG. 1, a typical layout of a Solc-type filter is shown. This layout is common to Solc-type filters. This filter comprises an input polarization selection device (e.g., polarizer) 11, an output polarization selection device 12, and a birefringent element assembly disposed generally intermediate the input polarization selection device 11 and the output polarization selection device 12. The polarization axis of the input polarization selection device 11 and the output polarization selection device 12 are typically parallel to one another.

According to contemporary practice, the birefringent element assembly 13 of such a Solc-type filter comprises three birefringent elements or crystals. A first birefringent crystal 15 has a length of L. A second birefringent crystal 16 has a length of 2L. A third birefringent crystal 17 has a length of 2L.

Although such contemporary Solc-type filters are generally suitable for some applications in optical communications, such contemporary Solc-type filters suffer from inherent deficiencies which detract from their overall effectiveness. Such contemporary Solc-type filters are birefringent filters which suffer from high dispersion when the actual channel wavelength is not at the nominal channel center wavelength.

As those skilled in the art will appreciate, dispersion is the non-linear phase response of an optical device or system wherein light of different wavelengths is spread or dispersed, such that the phase relationship among the different wavelengths varies undesirably as the light passes through the device or system. Such dispersion undesirably distorts optical signals, such as those used in optical communication systems.

The nonlinear phase response or dispersion of WDM and DWDM devices is responsible for signal distortion which results in undesired limitations on channel capability. That is, such dispersion undesirably limits the useable bandwidth of a channel, such as that of a fiber optic communication system. Such undesirable limitation of the bandwidth of a channel in a fiber optic communication system inherently reduces the bit rate of digital data transmitted thereby.

Contemporary interleavers have dispersion versus wavelength curves which have zero dispersion value at a particular wavelength, such as at nominal channel center wavelength. The dispersion versus wavelength curve of such contemporary interleavers departs drastically from this zero dispersion value as the wavelength moves away from the nominal channel center wavelength. Thus, small deviations in channel center wavelength can result in undesirably large dispersion values being realized.

Since, as discussed in detail above, it is extremely difficult, if not impossible, to maintain a channel center wavelength precisely at its nominal value, such channel center wavelengths do vary, thereby resulting in undesirably large dispersion values.

The problem of comparatively small differences between actual channel center wavelength and the nominal value thereof causing undesirably large dispersion values can be mitigated by constructing an interleaver having either a dispersion versus wavelength curve which has a value of approximately zero for all wavelengths, or alternatively, by constructing an interleaver having a dispersion versus wavelength curve which does not deviate substantially from a zero dispersion value at least for those wavelengths to which the actual channel center wavelength is likely to drift.

An optical interleaver is one type of comb filter which is commonly used in optical communications systems. Such interleavers have the potential for substantially enhancing performance in future optical communications networks by substantially enhancing bandwidth thereof. Common contemporary interleavers provide channel spacings of 200 GHz and 100 GHz. 50 GHz interleavers are just beginning to emerge in the marketplace. Further reduction of optical channel spacing to 25 GHz, 12.5 GHz and beyond presents substantial technical challenges.

As channel spacing is decreased below 50 GHz, significant and undesirable dispersion appears and can dramatically degrade optical signal quality, particularly in high bit rate optical communication systems. Thus, there is substantial need for techniques and apparatus which mitigate or suppress the dispersion introduced by an interleaver in an optical communication system. More generally, there also exists a similar need for techniques and apparatus which compensate for dispersion in various other devices, such as those commonly used in WDM/DWDM communication systems.

SUMMARY OF THE INVENTION

The present invention comprises techniques and apparatus which mitigate undesirable interleaver dispersion. The present invention also provides techniques and apparatus which compensate for dispersion from various different optical devices in an optical communication system.

More particularly, the present invention comprises a zero or low dispersion birefringent filter or interleaver assembly having a first interleaver and a second interleaver. The second interleaver is configured so as to provide a dispersion vs. wavelength curve wherein each dispersion value thereof is approximately opposite in value to a dispersion value at the same wavelength for the first interleaver, so as to mitigate dispersion in the interleaver assembly. In this manner, the dispersion of an interleaver substantially cancels out the dispersion of the other interleaver. In a similar manner, a single interleaver may be utilized to substantially mitigate dispersion in various other optical components in an optical communication system or the like.

These, as well as other advantages of the present invention, will be more apparent from the following description and drawings. It is understood that changes in the specific structure shown and described may be made within the scope of the claims without departing from the spirit of the invention.

BRIEF DESCRIPTION OF THE DRAWINGS

These, and other features, aspects and advantages of the present invention will be more fully understood when considered with respect to the following detailed description, appended claims and accompanying drawings wherein:

DETAILED DESCRIPTION OF THE INVENTION

Figure 1:
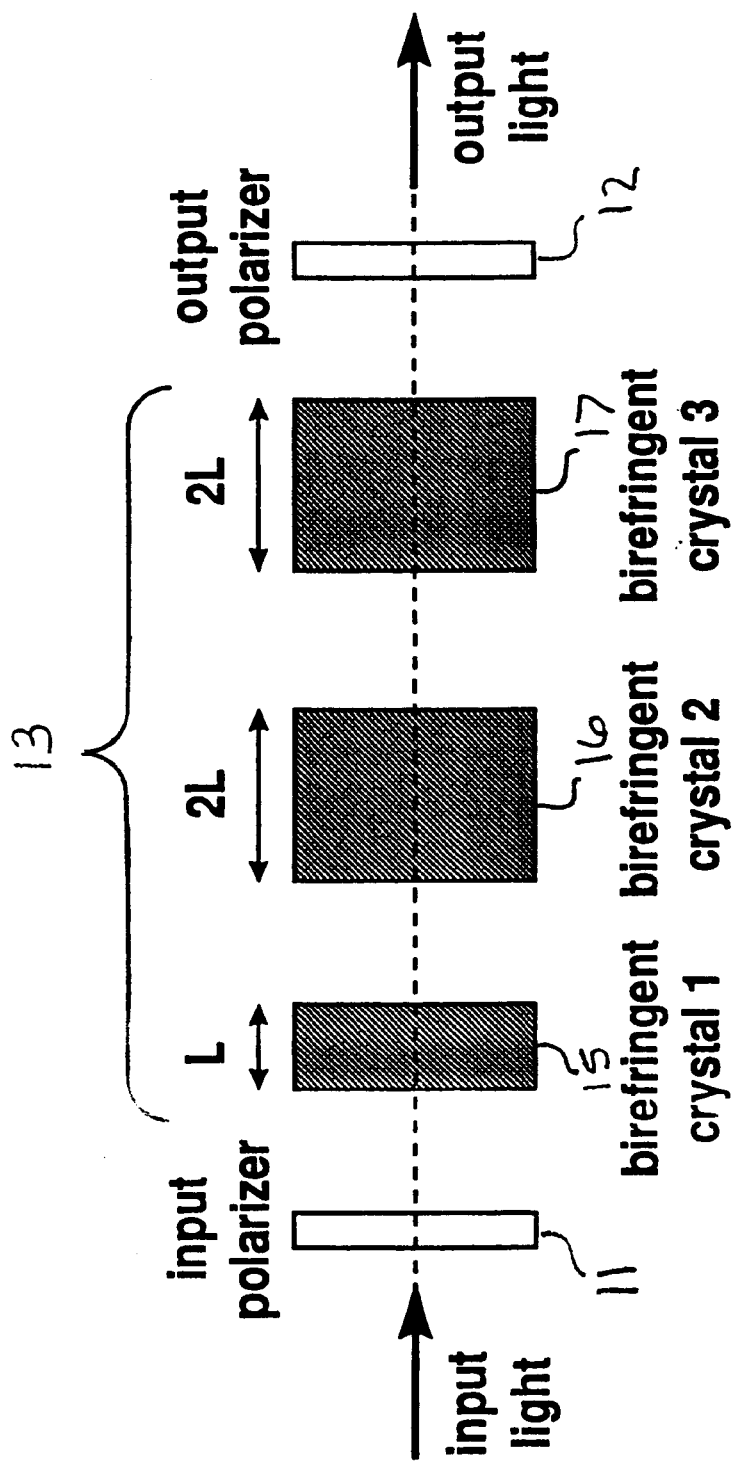
FIG. 1 is a schematic representation showing generally the relative positions of the input polarizing element, the birefringent element assembly (which comprises the first, second and third birefringent elements or crystals) and the output polarizing element, with respect to one another.

The detailed description set forth below in connection with the appended drawings is intended as a description of the presently preferred embodiments of the invention, and is not intended to represent the only forms in which the present invention may be constructed or utilized. The description sets forth the functions of the invention and the sequence of steps for constructing and operating the invention in connection with the illustrated embodiments. It is to be understood, however, that the same equivalent functions and sequences may be accomplished by different embodiments that are also intended to be encompassed within the spirit and scope of the invention.

Generally, the present invention comprises a filter for filtering electromagnetic radiation, wherein the filter comprises two polarization selection elements (such as polarizers) and a birefringent element assembly (such as an assembly of birefringent crystals) disposed intermediate the two polarization selection elements and configured so as to optimize contributions of a fundamental and at least one odd harmonic of a transmission vs. wavelength curve in a manner which enhances transmission vs. wavelength curve flatness for a passband thereof and also in a manner which makes the stopband thereof deeper and provides low dispersion, as well.

It has been found that an element of a birefringent element assembly, such as an element comprised of a birefringent crystal, can be used to alter a contribution of a fundamental and a plurality of odd harmonics to a transmission vs. wavelength curve, wherein the alteration depends upon the parameters selected for the birefringent element. For example, a birefringent element may be selected so as to have an optical path length and a fast axis orientation (such as with respect to a polarization selection element) wherein the values of these parameters determine how much of a fundamental and a plurality of odd harmonics are present in the transmission vs. wavelength characteristic curve of a filter assembly. Changing these parameters tends to change the amount of the fundamental and the amount of each odd harmonic present in the transmission vs. wavelength curve. By carefully selecting the parameters for each birefringent element, a transmission vs. wavelength curve can be defined having desired characteristics, such as flatness of the passband, width of the passband, depth of the stopband, and width of the stopband. In this invention, it is shown that the dispersion characteristics can be controlled by carefully selecting the parameters for each birefringent element.

Thus, the present invention comprises a filter for filtering electromagnetic radiation, wherein the filter comprises two polarization selection elements and a birefringent element assembly disposed intermediate the two polarization selection elements. The birefringent element assembly comprises a first birefringent element which provides an output transmission vs. wavelength curve which is approximately defined by a fundamental sine wave; a second birefringent element which cooperates with the first birefringent element to provide an output transmission vs. wavelength curve which is approximately defined by a fundamental sine wave plus a third harmonic of the fundamental sine wave; and a third birefringent element which cooperates with the first and second birefringent elements to provide an output vs. transmission curve which is approximately defined by a fundamental sine wave plus a third harmonic of the fundamental sine wave, plus a fifth harmonic of the fundamental sine wave. The parameters of the first, second and third birefringent elements are selected so as to enhance transmission vs. wavelength curve flatness for a filter passband and so as to deepen the stopband, and in addition, to also get desired dispersion behavior by causing the fundamental sine wave and its third and fifth harmonics to sum in an advantageous manner.

According to the present invention, the birefringent elements preferably have parameters which are specifically selected so as to provide generally optimized curve flatness for the passband and so as to provide enhanced depth for the stopband and to get desired dispersion behavior, thus enhancing performance of the filter and also substantially mitigating undesirable cross-talk and dispersion.

Those skilled in the art will appreciate that various different types of polarizing elements and birefringent elements may be utilized in such a birefringent element assembly. Thus, various different types of birefringent elements are suitable for use in the present invention. Also, various different types of polarization selection elements may similarly be utilized.

Generally, such a birefringent element must provide paths having different optical path lengths for two orthogonally polarized (with respect to one another) optical signals. Thus, according to the present invention, a birefringent element is defined as any optical device suitable for providing different optical path lengths for generally orthogonal optical signals, so as to substantially mimic the effect provided by birefringent crystals.

Generally, such polarization selection elements must select or favor the transmission of light having one particular polarization direction and substantially reject, i.e., either absorb, reflect or deflect light having all other polarization directions. Thus, according to the present invention, a polarization selection element or polarizing element is defined as any optical device suitable for facilitating the transmission of light having one polarization direction, while substantially mitigating (such as via reflection, deflection or absorption) the transmission of light having other polarization directions.

Thus, a birefringent filter for filtering electromagnetic radiation may be provided according to the present invention by disposing a birefringent element assembly between two polarization selection elements, wherein the birefringent element assembly provides an effect approximate to an effect provided by a first birefringent crystal providing a phase delay and having an angular orientation of a fast axis thereof of such as at approximately $\phi_1$ with respect to the polarization direction of the first polarization selection element, a second birefringent element providing a phase delay of approximately twice that of the first birefringent element and having an angular orientation of a fast axis thereof of such as at approximately $\phi_2$ with respect to the polarization axis of the same polarization selection element, and a third birefringent element providing a phase delay of approximately twice that of the first birefringent element and having an angular orientation of a fast axis thereof of such as at approximately $\phi_3$ with respect to the polarization axis of the same polarization selection element.

As defined herein, angular orientations ($\phi_1$, $\phi_2$ and $\phi_3$) are positive when they are clockwise as viewed looking into oncoming light and are negative when they are counter-clockwise as viewed looking into oncoming light.

It is important to understand that, although the second polarization selection element will typically have a polarization direction which is parallel to the polarization direction of the first polarization selection element, the second polarization selection element may alternatively have a polarization direction which is orthogonal to the polarization direction of the first polarization selection element. Indeed, the second polarization selection element may have any desired angular orientation with respect to the first polarization selection. Varying the angular orientation of the second polarization selection element with respect to the first polarization selection element merely shifts the transmission vs. wavelength curve of the filter in frequency. Thus, a filter having passbands and stopbands at desired wavelengths may be constructed by orienting the polarization direction of the second polarization selection element with respect to the polarization direction of the first polarization selection element appropriately.

The filter is suitable for use in an interleaver for separating channels from one another and/or for combining separate channels together in an optical communication system, such as a wavelength-division multiplexing system or a dense wavelength-division multiplexing system. That is, as those skilled in the art will appreciate, the filter is suitable for use in both multiplexing and demultiplexing applications. Thus, the filter of the present invention may find application in such interleavers as those commonly used in optical communication system receivers and transmitters.

Referring again to FIG. 1, the lengths of the birefringent crystals of the Solc-type filters are L, 2L and 2L for the first 15, second 16, and third 17 birefringent crystals, respectively. However, the angular orientation of each birefringent element or crystal has been varied, so as to optimize the resulting transmission vs. wavelength curve in a manner which enhances performance and mitigates undesirable crosstalk. More importantly, according to the present invention an interleaver is configured in a manner to get desired dispersion behavior.

The crystal orientation angles recited herein are defined as the angle between the fast axis of the birefringent element or crystal and the input light polarization direction of the light which has passed through the input polarization selection device or input polarizer 11. The sign convention for such angles is such that an angle is positive when resulting from clockwise rotation when facing the oncoming light and an angle is negative resulting from counterclockwise rotation when facing the oncoming light is negative. This convention is standard for the description of orientation angles in Solc-type filters.

Further, according to the one embodiment of the present invention, the phase delay of the first 15, second 16, and third 17 birefringent elements is provided by the relationship: $2\Gamma_1=\Gamma_2=\Gamma_3$, where $\Gamma_1$, $\Gamma_2$, $\Gamma_3$ are the phase delays for the first birefringent element 15, second birefringent element 16, and the third birefringent element 17, respectively. As those skilled in the art will appreciate, phase delay is proportional to a difference in optical path length.

The input polarization selection element 11 and the output polarization selection device 12 need not be parallel with respect to one another, but rather may have any other desired orientation. Generally, changing the orientation of the polarization axis of the output polarization selection device 12 with respect to the polarization axis of the input polarization selection element 11 results in a frequency shift (left or right movement of the transmission vs. wavelength curve) in the filter response.

The orientation of the polarization direction of the output polarization selection element with respect to the polarization direction of the input polarization selection element can be any desired angle. Changing the angle between the polarization direction of the output polarization selection element with respect to the polarization direction of the input polarization selection element merely shifts the transmission vs. wavelength curve in wavelength. That is, changing this angle merely changes the positions of the passbands and stopbands, so as to facilitate the selection of different desired channels in a wavelength division multiplexing or dense wavelength division multiplexing communication system. Thus, any desired or predetermined angle between the polarization direction of the output polarization selection element and the input polarization selection element may be utilized.

It is understood that the exemplary zero or extremely low dispersion filters described herein and shown in the drawings represent only presently preferred embodiments of the invention. Indeed, various modifications and additions may be made to such embodiments without departing from the spirit and scope of the invention. For example, various means for separating an input signal into orthogonal signals which then are caused to follow different optical paths so as to achieve a birefringent effect are contemplated. Also, various means for polarizing signals provided to and emitted from the birefringent element assembly are known. Generally, any device which allows the selective transmission of light having a predetermined polarization direction (which does not substantially transmit light having other polarization directions) is suitable. Thus, these modifications and additions may be obvious to those skilled in the art and may be implemented adapt the present invention for use in a variety of different applications.

Solc birefringent filters are commonly used as interleavers. Such Solc birefringent filters are discussed in detail above. When a single Solc birefringent filter is utilized alone, the Solc birefringent filter contributes some amount of dispersion to an optical signal transmitted therethrough. However, for a given Solc birefringent filter the quantity and the sign of the dispersion can be controlled by carefully selecting the birefringent phase delays (the optical path lengths) and the birefringent element orientations. In this manner, one Solc birefringent filter or interleaver may be constructed so as to substantially cancel the dispersion introduced by another Solc birefringent filter or interleaver. More generally, a Solc birefringent filter or interleaver can be constructed so as to substantially mitigate the dispersion caused by itself or any other device or combination of devices so as to minimize the total dispersion.

Referring now to FIG. 1, as discussed above, according to contemporary Solc filter construction, several, typically three, birefringent elements, such as birefringent crystal 15, birefringent crystal 16 and birefringent crystal 17 are disposed between two polarization selection elements, such as input polarizer 11 and output polarizer 12. Birefringent crystal 15, birefringent crystal 16 and birefringent crystal 17 define a birefringent element assembly 13. Typically, each birefringent crystal 15, 16, and 17 is comprised of a material having the same indices of refraction as each other birefringent crystal and the physical lengths of the three birefringent crystals are L, 2L and 2L, for each of the birefringent crystals 15, 16 and 17, respectively. However, as those in the field will appreciate, crystals comprised of different materials (and therefore having different indices of refraction) may alternatively be utilized and the physical lengths thereof may be adjusted to provide the equivalent phase delay, $\Gamma$, $2\Gamma$, $2\Gamma$, for each of the birefringent crystals 15, 16 and 17, respectively. An angle between the fast axis of each birefringent crystal 15, 16 and 17 and the polarization direction of the input polarizer 11 is 45° for the first birefringent crystal 15; −15° for the second birefringent crystal 16; and 10° for the third birefringent crystal 17. Each of the angular orientations is defined as positive if rotation is clockwise while viewing oncoming light from the input polarizer 11 and is negative if rotation is counterclockwise while viewing oncoming light from the input polarizer 11. This sign convention is the same sign convention that is commonly used by those skilled in the art of Solc filter construction.

Figure 2:
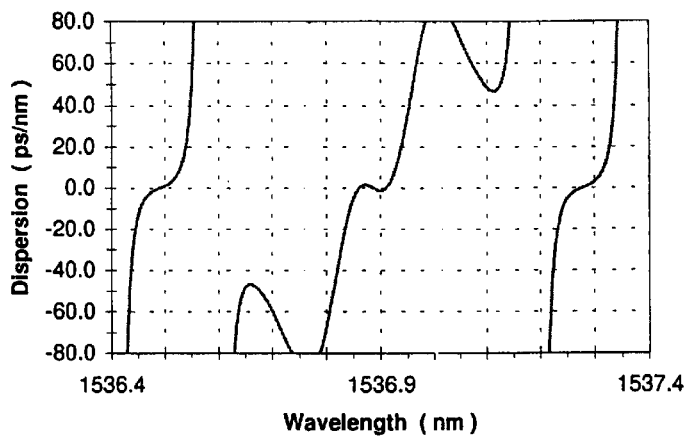
FIG. 2 is a dispersion vs. wavelength chart for a three element filter having angular orientations of 45°, −15°, and 10° and having phase delays of $\Gamma$, $2\Gamma$ and $2\Gamma$ respectively, for the first, second and third birefringent crystals, respectively.
Figure 3:
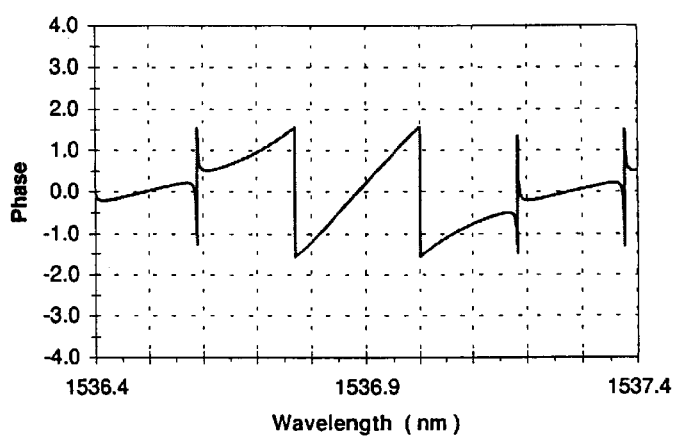
FIG. 3 is a phase vs. wavelength chart for a three element filter having angular orientations of 45°, −15°, and 10° and having phase delays of $\Gamma$, $2\Gamma$ and $2\Gamma$, for the first, second and third birefringent crystals, respectively.
Figure 4:
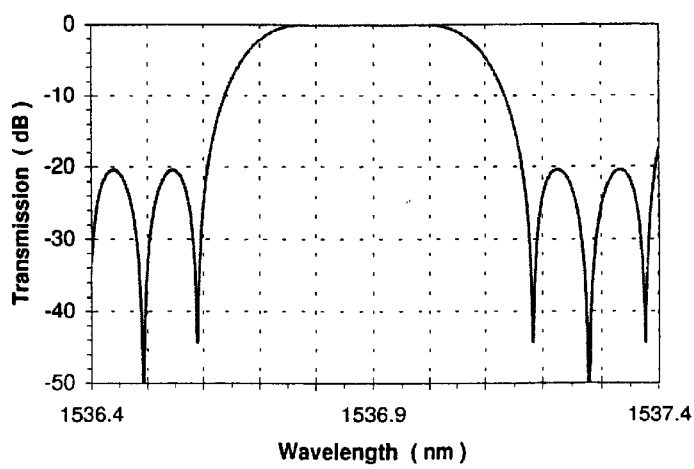
FIG. 4 is a transmission vs. wavelength chart for a three element filter having angular orientations of 45°, −15°, and 10° and having phase delays of $\Gamma$, $2\Gamma$ and $2\Gamma$, for the first, second and third birefringent crystals, respectively.

Referring now to FIGS. 2–4, the dispersion (FIG. 2), phase distortion (FIG. 3), and transmission (FIG. 4) for a Solc birefringent filter having orientations of 45°, −15°, and 10° for the first 15, second 16 and third 17 birefringent crystals thereof and having phase delays of $\Gamma$, $2\Gamma$, and $2\Gamma$ for the first 15, second 16 and third 17 birefringent crystals, respectively, are provided.

With particular reference to FIG. 2, the filter dispersion as a function of wavelength for a 50 GHz interleaver using the contemporary crystal orientations of 45°, −15° and 10° is shown. The dispersion increased very rapidly as wavelength moves away from the center wavelength of the pass band.

The channel wavelength cannot always be well controlled at the pass band center due to various limitations in devices and in the communication system, as described in detail above. Therefore, channel wavelength deviation can lead to undesirably large dispersion and thereby substantially degrade the signal quality.

According to the present invention, dispersion can be substantially compensated for interleavers as well as in other devices as discussed in detail below. If $\phi_1$, $\phi_2$ and $\phi_3$ are the crystal orientations for the first 15, second 16 and third 17 crystals, respectively, then the same transmission performance can be obtain at crystal orientations of 90°−$\phi_1$, 90°−$\phi_2$ and 90°−$\phi_3$, as well 90°+$\phi_1$, 90°+$\phi_2$ and 90°+$\phi_3$, respectively. However, for each of these two new sets of crystal orientations, the dispersion curve is flipped about the zero dispersion axis. That is, for each of the two new sets of crystal orientations, the dispersion for each wavelength has an opposite value to that of the original set of orientations ($\phi_1$, $\phi_2$ and $\phi_3$). By matching one set of crystal orientations with another set of crystal orientations having opposite dispersion valves, approximately zero dispersion is obtained. Thus, one set of birefringent crystals can be made to substantially cancel the dispersion introduced by another set of birefringent crystals (or by any other component or system) when letting optical signals pass through them sequentially.

Thus, for example, the two angle sets of 45°, −75°, and 80° (corresponding to 90°−$\phi_1$, 90°−$\phi_2$ and 90°−$\phi_3$) and 135°, 75° and 100° (corresponding to 90°+$\phi_1$, 90°+$\phi_2$ and 90°+$\phi_3$) provide the same transmission performance as the original angles of 45°, −15° and 10°, but provide dispersion curves which are the opposite of, i.e. flipped with respect to, these original angles. It is important to appreciate that adding or subtracting 180° to any of the birefringent element angular orientations provides an equivalent angular orientation therefor, and thus does not alter the characteristics the filter. Thus, two separate birefringent filters, wherein one birefringent filter has angles of $\phi_1$, $\phi_2$ and $\phi_3$ while the other birefringent filter has birefringent crystals of either 90°−$\phi_1$, 90°−$\phi_2$ and 90°−$\phi_3$ or 90°+$\phi_1$, 90°+$\phi_2$ and 90°+$\phi_3$ define a birefringent filter assembly wherein the dispersion of one of the birefringent filters thereof substantially cancels out the dispersion of the other birefringent filter thereof.

Figure 5:
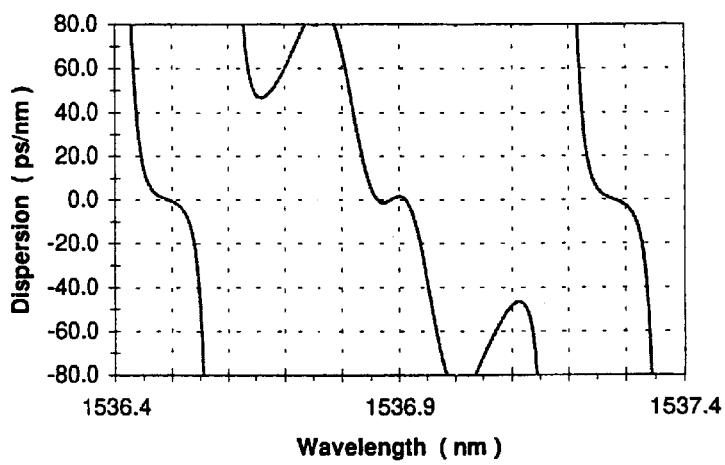
FIG. 5 is a dispersion vs. wavelength chart for a three element filter having angular orientations of 45°, −75°, and 80° and having phase delays of $\Gamma$, $2\Gamma$ and $2\Gamma$, for the first, second and third birefringent crystals, respectively.
Figure 6:
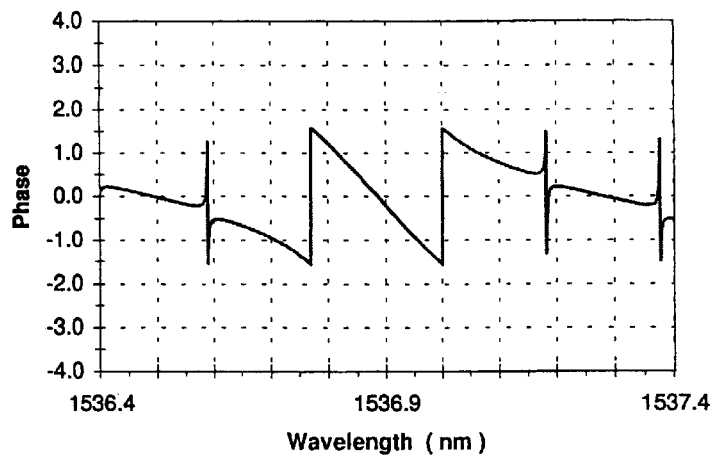
FIG. 6 is a phase vs. wavelength chart for a three element filter having angular orientations of 45°, −75°, and 80° and having phase delays of $\Gamma$, $2\Gamma$ and $2\Gamma$, for the first, second and third birefringent crystals, respectively.
Figure 7:
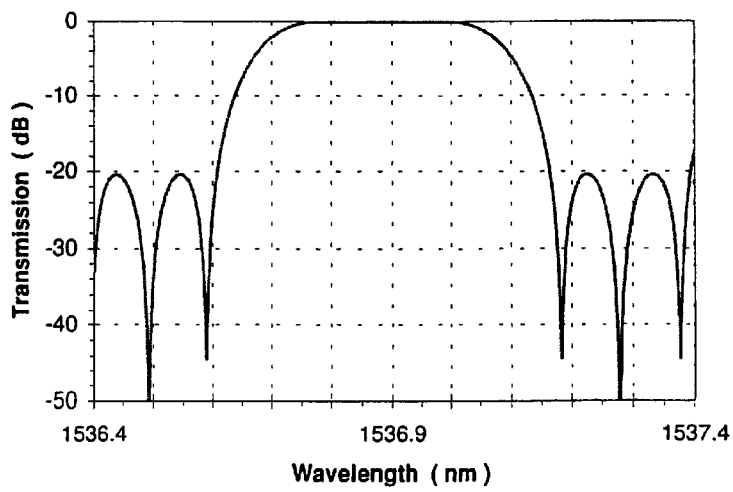
FIG. 7 is a transmission vs. wavelength chart for a three element filter having angular orientations of 45°, −75°, and 80° and having phase delays of $\Gamma$, $2\Gamma$ and $2\Gamma$, for the first, second and third birefringent crystals, respectively.

FIGS. 5–7 show the dispersion, phase distortion, and transmission versus wavelength characteristic charts for a birefringent filter having angles of 45°, −75°, and 80° for the first 15, second 16, and third 17 birefringent crystals thereof and having phase delay of $\Gamma$, $2\Gamma$, and $2\Gamma$ therefore.

With particular reference to FIG. 5, it should be appreciated that dispersion curve is flipped, with respect to the dispersion curve of FIG. 2, such that each dispersion value of FIG. 5 is opposite that of FIG. 2. Therefore, combining the birefringent filter which provides the dispersion curve of FIG. 2 with the birefringent filter which provides the dispersion curve of FIG. 5 will result in a substantially flat dispersion curve. It is worthwhile to note that the substantially flat dispersion curve resulting from the cooperation of two such birefringent filters (wherein each birefringent filter has a dispersion curve which is flipped with respect to the other birefringent filter) extends well beyond the pass band of the transmission versus wavelength curve for each of the birefringent filters and that the dispersion obtained by such a dual birefringent filter device is not dependent upon maintaining a channel center wavelength near the center of the pass band.

Various different sets of angles for the birefringent crystals may be utilized. Thus, the set of angles of 45°, −21°, and 7°, which provides enhanced pass band/stop band characteristics, may be utilized so as to facilitate mitigation of undesirable crosstalk. For the angles 45°, −21° and 7° the angle sets which provide such canceling or flipped dispersion characteristics are 45°, −69° and 83°, as well as 135°, 69° and 97°. Thus, by utilizing the set of angles of 45°, −21°, and 7° in a first birefringent filter or interleaver, along with a set of angles of either 45°, −69° and 83° or 135°, 69° and 97° in a second birefringent filter or interleaver, both enhanced pass band/stop band characteristics and enhanced dispersion may be achieved.

Figure 8:
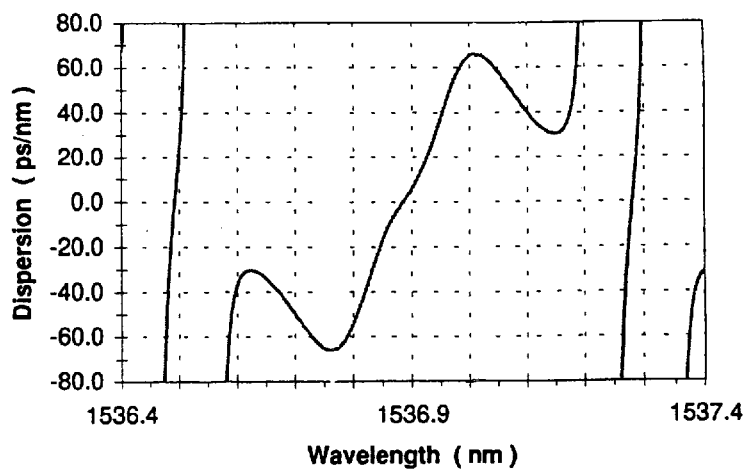
FIG. 8 is a dispersion vs. wavelength chart for a three element filter having angular orientations of 45°, −21°, and 7° and having phase delays of $\Gamma$, $2\Gamma$ and $2\Gamma$, or the first, second and third birefringent crystals, respectively.
Figure 9:
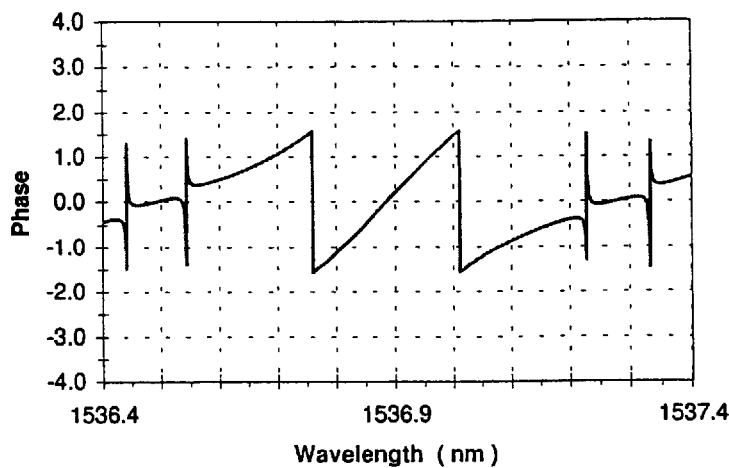
FIG. 9 is a phase vs. wavelength chart for a three element filter having angular orientations of 45°, −21°, and 7° and having phase delays of $\Gamma$, $2\Gamma$ and $2\Gamma$, for the first, second and third birefringent crystals, respectively.
Figure 10:
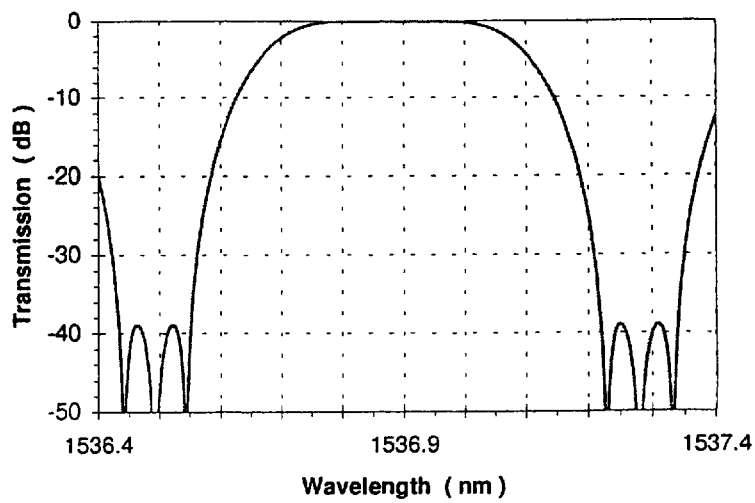
FIG. 10 is a transmission vs. wavelength chart for a three element filter having angular orientations of 45°, −21°, and 7° and having phase delays of $\Gamma$, $2\Gamma$ and $2\Gamma$, for the first, second and third birefringent crystals, respectively.
Figure 11:
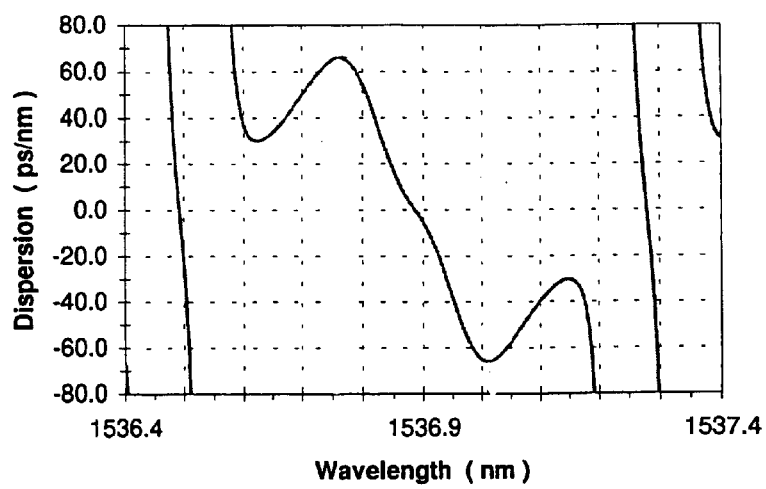
FIG. 11 is a dispersion vs. wavelength chart for a three element filter having angular orientations of 45°, −69°, and 83° and having phase delays of $\Gamma$, $2\Gamma$ and $2\Gamma$, for the first, second and third birefringent crystals, respectively.
Figure 12:
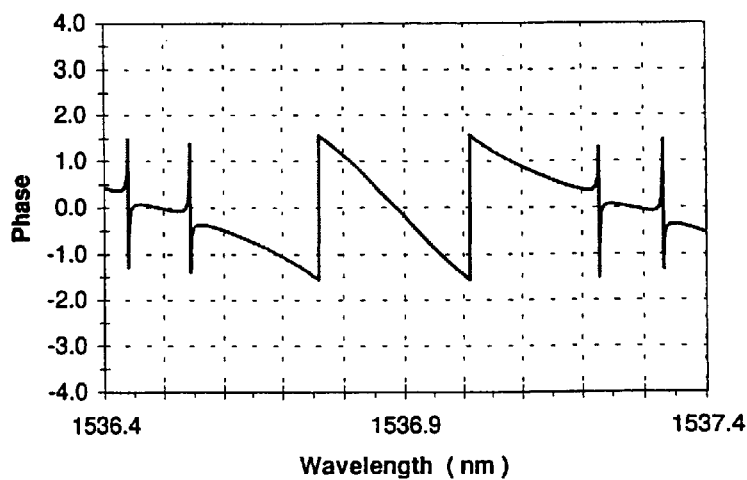
FIG. 12 is a phase vs. wavelength chart for a three element filter having angular orientations of 45°, −69°, and 83° and having phase delays of $\Gamma$, $2\Gamma$ and $2\Gamma$, for the first, second and third birefringent crystals, respectively.
Figure 13:
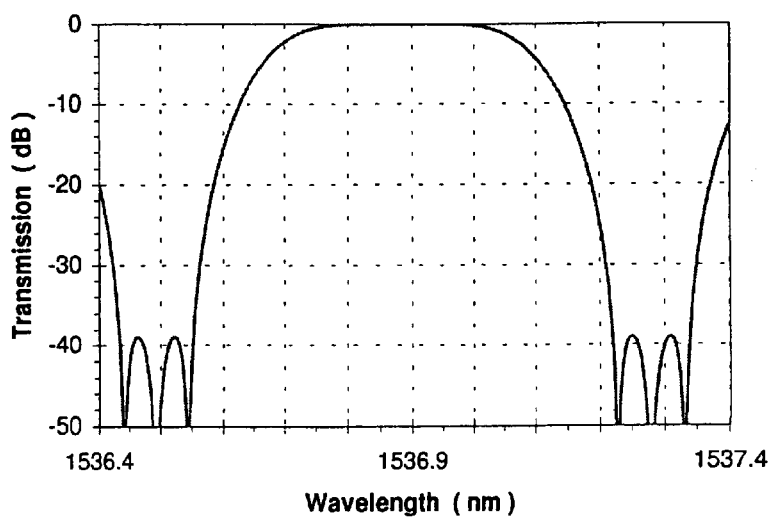
FIG. 13 is a transmission vs. wavelength chart for a three element filter having angular orientations of 45°, −69°, and 83° and having phase delays of $\Gamma$, $2\Gamma$ and $2\Gamma$, for the first, second and third birefringent crystals, respectively.

FIGS. 8–10 show the dispersion, phase distortion and transmission versus wavelength curves for a Solc birefringent filter having orientation angles of 45°, −21°, and 7° for the first 15, second 16 and third 17 crystals thereof and having phase delays of $\Gamma$, $2\Gamma$, and $2\Gamma$ therefor. Similarly, FIGS. 11–13 show the dispersion, phase distortion and transmission versus wavelength curves for a birefringent filter having crystal angles of 45°, −69°, and 83° for the first 15, second 16 and third 17 crystals respectively and also having phase delays of $\Gamma$, $2\Gamma$, and $2\Gamma$ therefor. It is clear from an inspection of FIGS. 8 and 11 that the dispersions provided by the birefringent filter having 45°, −21°, and 7° is opposite to the values of dispersion provided by the birefringent filter having 45°, −69°, and 83°. Thus, by combining these two birefringent filters, a single birefringent filter assembly or interleaver can be provided wherein this dispersion of one birefringent filter cancels out the dispersion of the other birefringent filter. In this manner, a birefringent filter assembly having approximately zero dispersion for the pass band portion of the transmission curve (as well as for other portions of the transmission curve) is provided.

Thus, for example, if optical communication beams are transmitted through two separate interleavers sequentially, wherein the two separate interleavers have been designed such that they have flipped dispersion curves with respect to one another, then the dispersion of one filter substantially cancels the dispersion of the other filter, such that approximately zero dispersion is obtained.

Two interleavers may be utilized in a cascaded configuration so as to enhance channel capacity. For example a 50 GHz interleaver and a 25 GHz interleaver can be used together so as to either multiplex or demultiplex optical signals from a 25 GHz space into a 100 GHz spacing and vice versa. According to the present invention, such a 50 GHz interleaver and such a 25 GHz interleaver can be configured in such a manner that the dispersion of each interleaver is generally opposite with respect to the dispersion of the other interleaver and the two interleavers substantially cancel the dispersion of each other.

More generally, the first interleaver comprises an N GHz interleaver and the second interleaver comprises an N/2 GHz interleaver. That is, the first interleaver preferably has a channel spacing which is twice as large as that of the second interleaver. Those skilled in the art will appreciate that various other multiples or ratios of the channel spacing of the first interleaver to the channel spacing of the second interleaver are likewise suitable.

Further, according to the present invention, a birefringent filter can be formed in a manner which provides a desired dispersion curve so as to substantially cancel dispersion caused by another optical device (such as by an optical device other than another interleaver). Thus, according to the present invention, dispersion versus wavelength curves having various different shapes can be obtained by varying the angular orientation of the crystals or birefringent elements of a birefringent filter. In order to compensate for the dispersion of optical device other than birefringent filter, the angular orientations of the birefringent crystals of a birefringent filter are varied in a manner which provides a dispersion versus wavelength curve having values which are opposite to those of the other device over the desired range of wavelengths.

Further, according to the present invention, dispersion can be mitigated in a single interleaver assembly, i.e. an interleaver assembly having only a single Solc filter, by carefully selecting the crystal orientations thereof.

Figure 14:
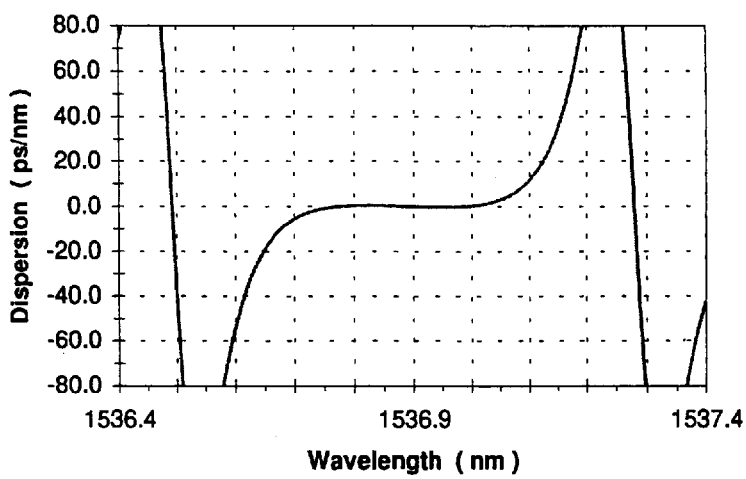
FIG. 14 is a dispersion vs. wavelength chart for a three element filter having angular orientations of 45°, −65°, and 15° and having phase delays of $\Gamma$, $2\Gamma$ and $2\Gamma$, for the first, second and third birefringent crystals, respectively.
Figure 15:
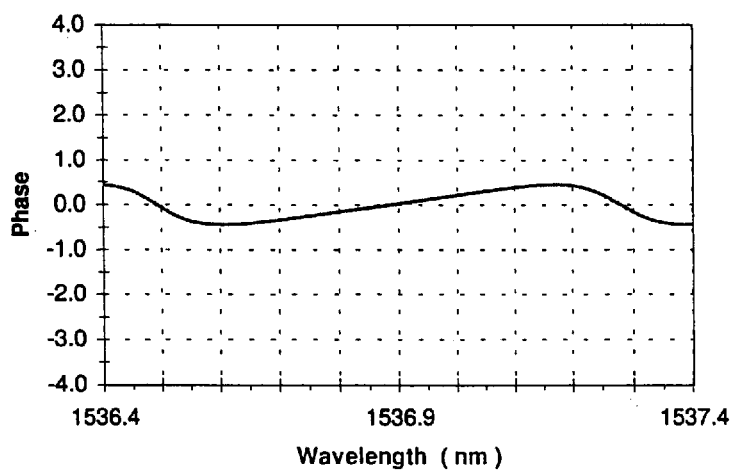
FIG. 15 is a phase vs. wavelength chart for a three element filter having angular orientations of 45°, −65°, and 15° and having phase delays of $\Gamma$, $2\Gamma$ and $2\Gamma$, for the first, second and third birefringent crystals, respectively.
Figure 16:
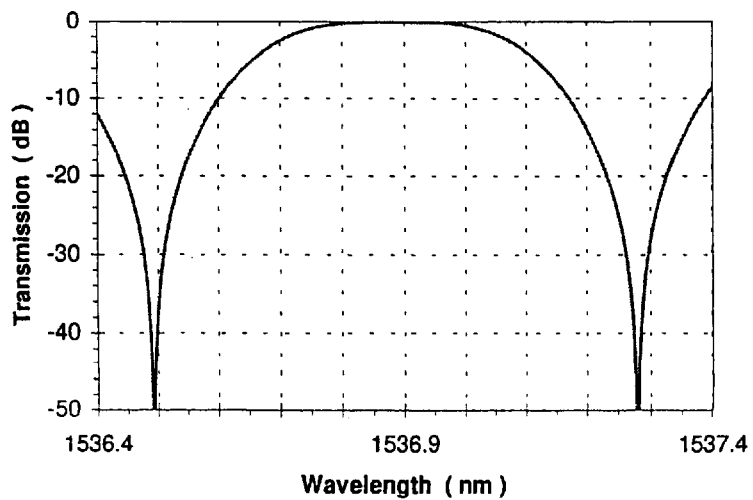
FIG. 16 is a transmission vs. wavelength chart for a three element filter having angular orientations of 45°, −65°, and 15° and having phase delays of $\Gamma$, $2\Gamma$ and $2\Gamma$, for the first, second and third birefringent crystals, respectively.
Figure 17:
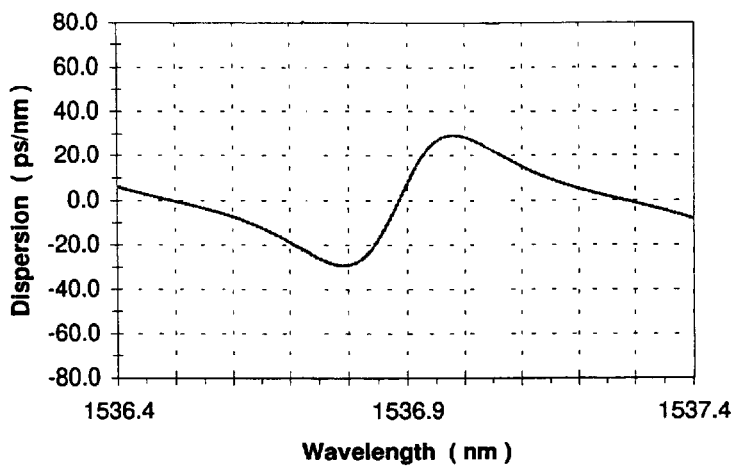
FIG. 17 is a dispersion vs. wavelength chart for a three element filter having angular orientations of 45°, −15°, and 0° and having phase delays of $\Gamma$, $2\Gamma$ and $2\Gamma$, for the first, second and third birefringent crystals, respectively.
Figure 18:
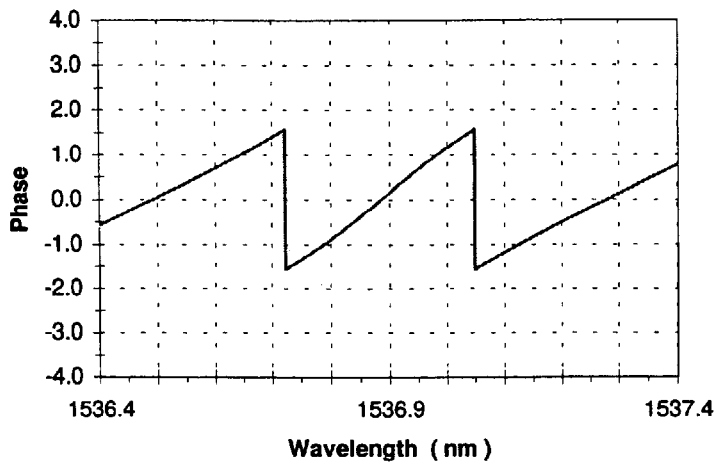
FIG. 18 is a phase vs. wavelength chart for a three element filter having angular orientations of 45°, −15°, and 0° and having phase delays of $\Gamma$, $2\Gamma$ and $2\Gamma$, for the first, second and third birefringent crystals, respectively.
Figure 19:
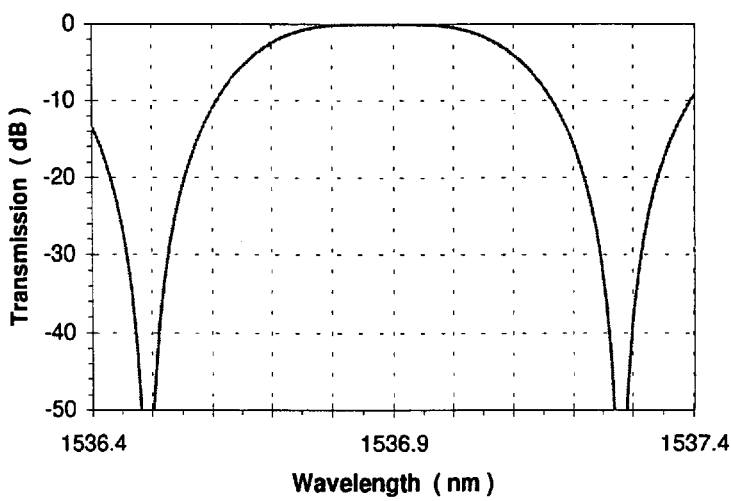
FIG. 19 is a transmission vs. wavelength chart for a three element filter having angular orientations of 45°, −15°, and 0° and having phase delays of $\Gamma$, $2\Gamma$ and $2\Gamma$, for the first, second and third birefringent crystals, respectively.
Figure 20:
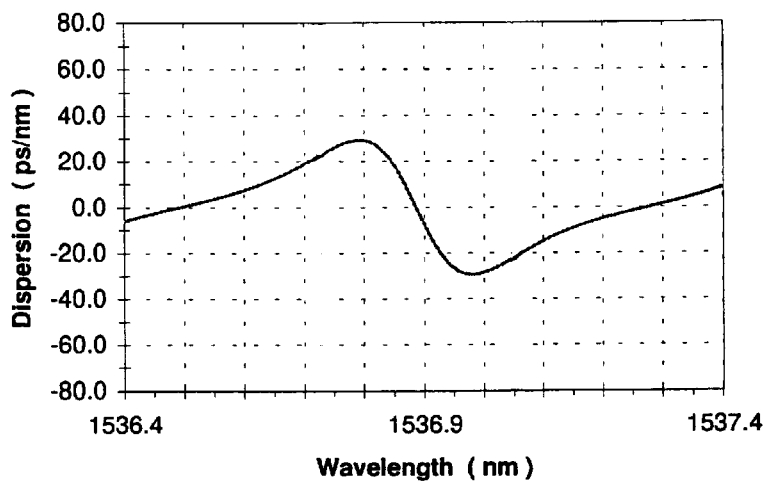
FIG. 20 is a dispersion vs. wavelength chart for a three element filter having angular orientations of 45°, −75°, and 90° and having phase delays of $\Gamma$, $2\Gamma$ and $2\Gamma$, for the first, second and third birefringent crystals, respectively.
Figure 21:
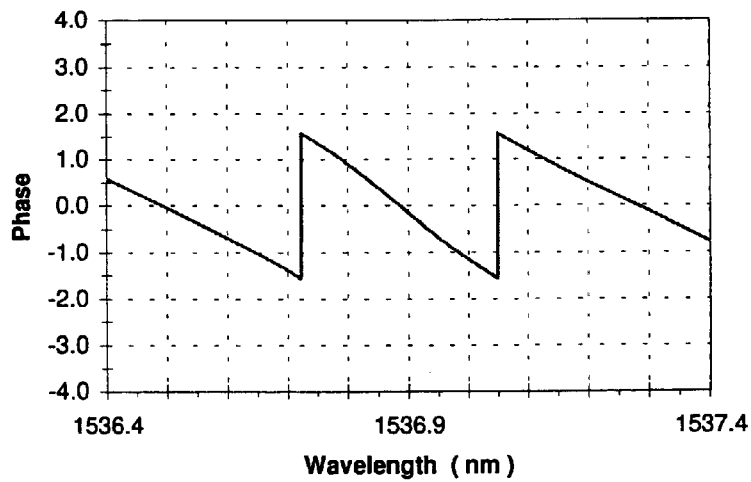
FIG. 21 is a phase vs. wavelength chart for a three element filter having angular orientations of 45°, −75°, and 90° and having phase delays of $\Gamma$, $2\Gamma$ and $2\Gamma$, for the first, second and third birefringent crystals, respectively.
Figure 22:
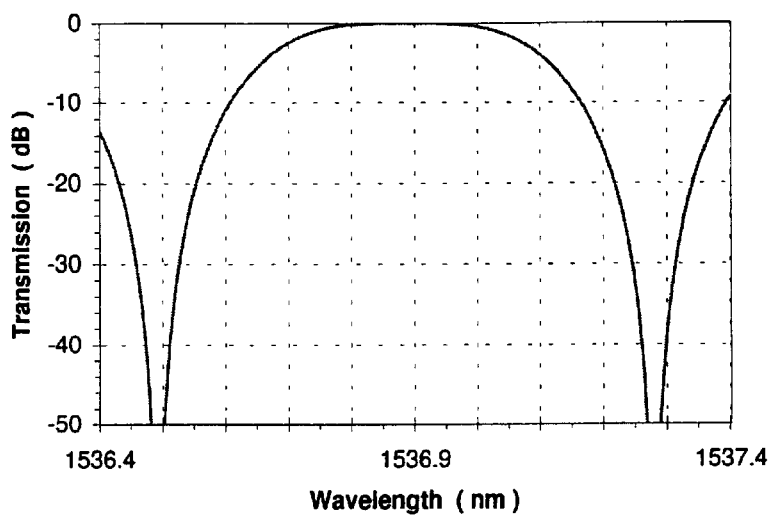
FIG. 22 is a transmission vs. wavelength chart for three element filter having angular orientations of 45°, −75°, and 90° and having phase delays of $\Gamma$, $2\Gamma$ and $\Gamma$, for the first, second and third birefringent crystals, respectively.

FIGS. 14–16 show the dispersion, phase distortion and transmission versus wavelength curves for a single Solc filter assembly, i.e. a birefringent filter assembly, having only a single Solc filter, wherein the angular orientations of the first birefringent crystal 15, second birefringent crystal 16 and third birefringent crystal 17, having phase delays of $\Gamma$, $2\Gamma$ and $2\Gamma$, respectively, have been carefully selected so as to minimize dispersion over the range of wavelengths defined by the pass band (as shown in FIG. 16). Similar and small dispersion can be obtained at (45, −65, 15), (45°, −25°, 75°) or (135°, 25°, 105°). These angles are selected by choosing $\phi_1$ to be close to 45° or at 135° and then selecting $\phi_2$ and $\phi_3$ such that $\phi_3-\phi_2$ is approximately plus or minus 90°. In this manner, a birefringent filter or interleaver can be made having only three birefringent elements or crystals (rather than having six birefringent elements or crystals as in the paired filters described above), wherein dispersion is mitigated.

Further angles which are + or −180° with respect to any of the above discussed angles is equivalent, thus will provide the same results. Very similar results may be obtained if the angles deviate from the ideal angles by only a few degrees.

Further, for three crystal birefringent filters, the first and third crystals can be swapped in their physical locations and the interleaver will provide the same performance, i.e., will have the same transmission vs. wavelength curve and the same dispersion vs. wavelength curve. Thus, as shown in FIG. 1, the positions of the first birefringent crystal 15 and third birefringent crystal 17 may be swapped without altering the performance of the birefringent filter.

As discussed above, it is possible to utilize devices other than birefringent crystals in order to obtain a birefringent effect. In such instances, the angles discussed above with respect to birefringent crystals may be converted to relative angles between the polarization direction of the input polarization selection element and the fast axis of the birefringent elements.

Further, note that $2\Gamma_1=\Gamma_2=\Gamma_3$, where $\Gamma_1$, $\Gamma_2$ and $\Gamma_3$ are the phase delays for birefringent element 1, birefringent element 2 and birefringent element 3, respectively. For example, a polarization beam splitter (PBS) or a polarization beam displacer (PBD) may be utilized to separate an incoming unpolarized optical beam into 2 orthogonally polarized optical beams, wherein the two beams experience different optical paths before being recombined to realize the birefringent effect.

Those skilled in the art will appreciate that the present invention may be utilized to provide an interleaver having any desired channel spacing.

Referring now to FIGS. 17–22, the dispersion versus wavelength, phase distortion versus wavelength and transmission versus wavelength curves for two different birefringent filters or interleavers are shown, wherein the two birefringent filters or interleavers have dispersion versus wavelength curves which are flipped with respect to one another. Thus, use of the two birefringent filters or interleavers configured according to the present invention results in approximately zero dispersion.

The birefringent filters or interleavers which provide the curve shown in FIGS. 17–22 both have phase delays of $\Gamma$, $2\Gamma$, $\Gamma$ for birefringent elements 1, 2, 3, respectively. The birefringent filter or interleaver which provides the curves of FIGS. 17–19 uses birefringent element orientations of 45°, −15° and 0° for birefringent elements 1, 2, 3. The birefringent filter or interleaver which provides the curves of FIGS. 20–22 utilizes birefringent element orientations of 45°, −75°, and 90° for birefringent elements 1, 2, 3.

It may be beneficial, at least in some instances, to provide a birefringent filter or interleaver having phase delays of $\Gamma$, $2\Gamma$, $\Gamma$, since the birefringent elements used in such a device may be constructed so as to have an overall length which is shorter than that of a device having phase delays of $\Gamma$, $2\Gamma$ and $2\Gamma$. Thus, by constructing such a device to have phase delays or birefringent element lengths of $\Gamma$, $2\Gamma$, $\Gamma$, a device which is shorter and less expensive maybe constructed. The device may be less expensive since a smaller third birefringent element is utilized, thereby reducing costs.

The exemplary low dispersion birefringent filter assemblies discussed above utilizes two birefringent filters, wherein each birefringent filter is comprised of three birefringent elements. It is also possible to construct a birefringent filter assembly, wherein each birefringent filter thereof comprises only two birefringent elements. Such a birefringent filter assembly can be constructed in a manner wherein each birefringent filter substantially cancels out the dispersion caused by the other birefringent filter. However, since only two birefringent elements are used in each such birefringent filter, the pass bands and stop bands thereof are not optimized as in the three birefringent element filters described above. That is, the pass bands of the two birefringent filters tend to cover a narrower range of wavelengths and the stop bands thereof tend to be more shallow. However, it is anticipated that in some instances it will be beneficial to provide a low dispersion filter assembly utilizing only two birefringent elements in each filter thereof, such as to maintain low cost of the birefringent filter assembly. As with the three birefringent element Solc birefringent filters described above, two element birefringent filters are constructed such that the dispersion of one birefringent filter substantially cancels the dispersion of the other birefringent filter.

Figure 23:
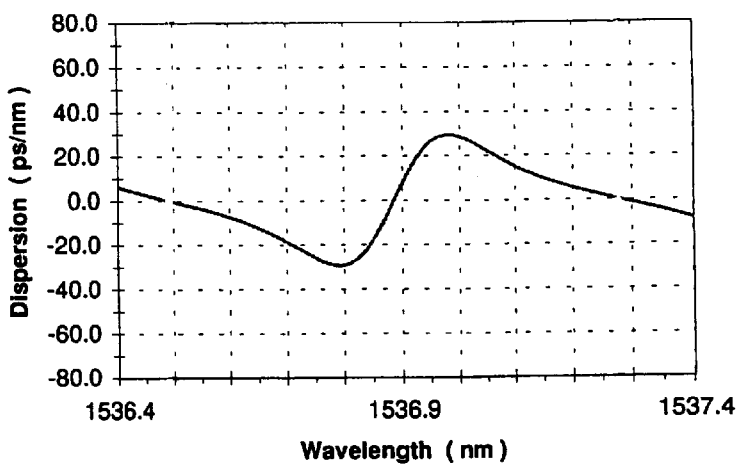
FIG. 23 is a dispersion vs. wavelength chart for a two element filter having angular orientations of 45° and −15° and having phase delays of $\Gamma$ and $2\Gamma$, for the first and second birefringent crystals, respectively.
Figure 24:
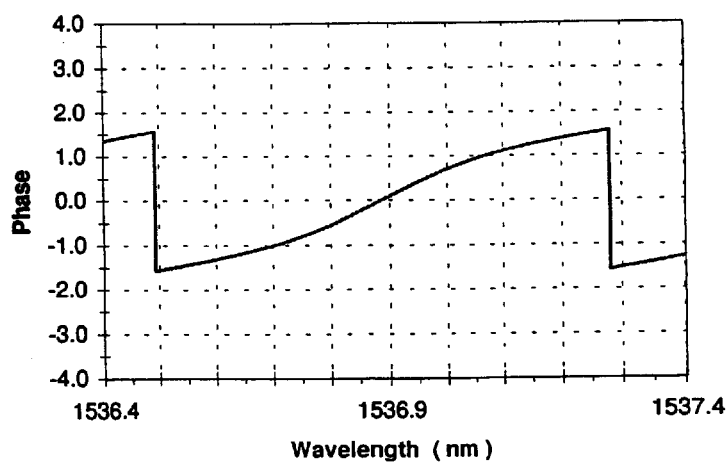
FIG. 24 is a phase vs. wavelength chart for a two element filter having angular orientations of 45° and −15° and having phase delays of $\Gamma$ and $2\Gamma$, for the first and second birefringent crystals, respectively.
Figure 25:
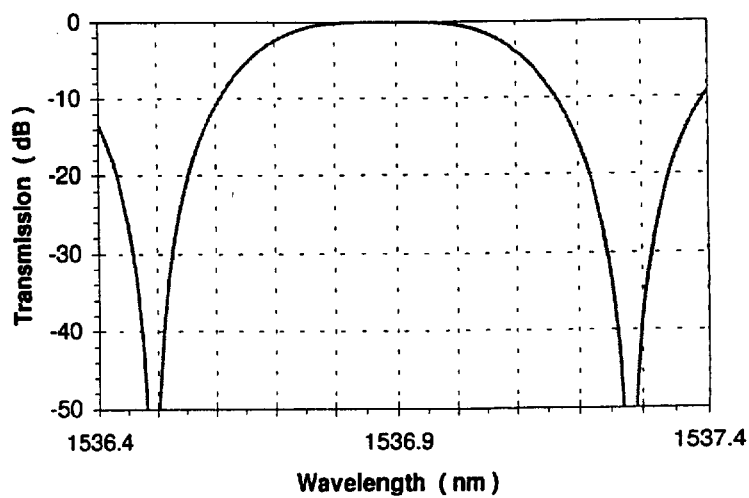
FIG. 25 is a transmission vs. wavelength chart for a two element filter having angular orientations of 45° and −15° and having phase delays of Γ and 2Γ, for the first and second birefringent crystals, respectively.

Referring now to FIGS. 23–25, angles of 45° and −15° are utilized for a first birefringent crystal 15 and a second birefringent crystal 16, respectively and the phase delays are Γ and 2Γ, respectively. This is one example of a two element birefringent filter which may be utilized in a birefringent filter assembly, wherein each two element birefringent filter thereof tends to cancel out the dispersion introduced by the other two element birefringent filter.

Figure 26:
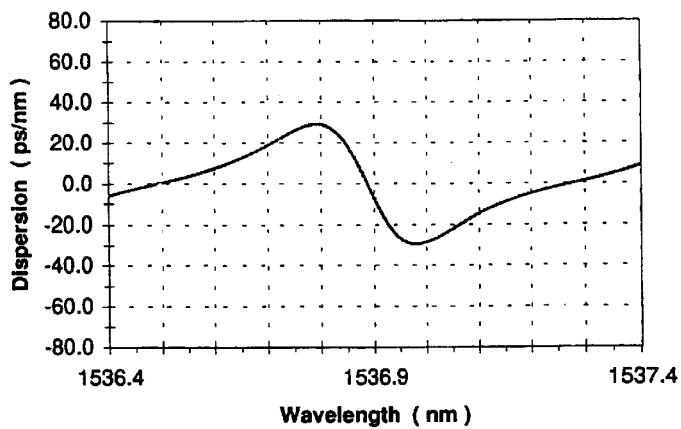
FIG. 26 is a dispersion vs. wavelength chart for a two element filter having angular orientations of the birefringent crystals thereof of 45° and −75° and having phase delays of Γ and 2Γ, for the first and second birefringent crystals, respectively.
Figure 27:
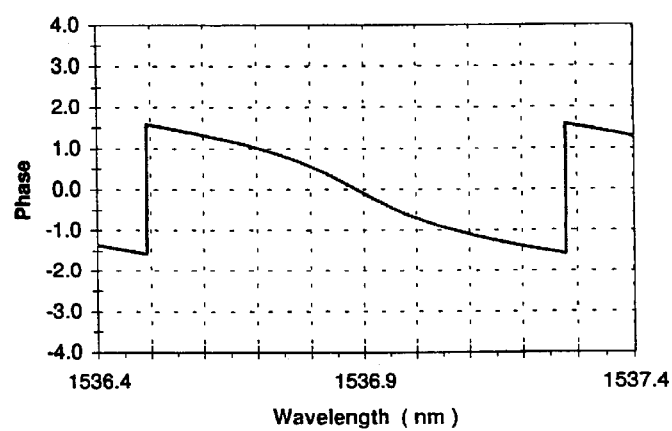
FIG. 27 is a phase vs. wavelength chart for a two element filter having angular orientations of the birefringent crystals thereof of 45° and −75° and having phase delays of Γ and 2Γ, for the first and second birefringent crystals, respectively.
Figure 28:
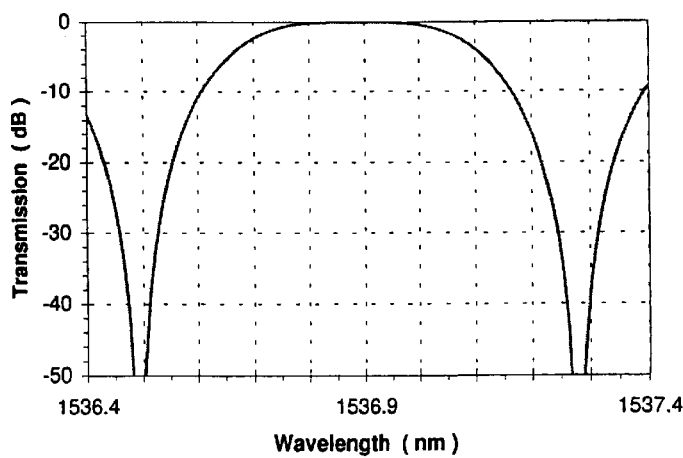
FIG. 28 is a transmission vs. wavelength chart for a two element filter having angular orientations of the birefringent crystals thereof of 45° and −75° and having phase delays of Γ and 2Γ, for the first and second birefringent crystals, respectively.

With particular reference to FIG. 23, these crystal orientations provide a characteristic dispersion curve, as shown. As discussed above, a second birefringent filter, having a flipped dispersion curve with respect to this birefringent filter, can be utilized so as to substantially mitigate dispersion in a birefringent filter assembly comprised of both such birefringent filters. Referring now to FIGS. 26–28, angular orientations of 45° and −75° for the first birefringent crystal 15 and the second birefringent crystal 16 are provided and the first and second birefringent crystals have phase delays of Γ and 2Γ, respectively.

With particular reference to FIG. 26 it is clear that the dispersion curve shown therein is flipped with respect to the dispersion curve of FIG. 23. Thus, as with the three element birefringent filters discussed above, two element birefringent filters may be utilized in a single birefringent element assembly so as to substantially cancel dispersion particularly over a desired range of wavelengths.

Also, such two element birefringent filters may be utilized to substantially cancel dispersion from any other (non-interleaver) optical device by defining a dispersion curve for such canceling, as discussed above.

Further, according to the present invention a birefringent filter having any desired number of elements may be formed so as to provide variable dispersion, such as by facilitating the rotation of one or more of the birefringent elements thereof. Thus, a tunable birefringent filter may be provided wherein adjustments to the dispersion versus wavelength curve thereof may be effected either in a realtime or non-realtime mode.

It is important to appreciate that the technique for mitigating dispersion of the present invention is applicable to optical devices such as birefringent filters and interleavers regardless of the angles of the birefringent elements thereof. That is, for any given set of angles of birefringent elements, dispersion may typically be substantially mitigated by transmitting the light through another, typically similar, device having angular orientations of 90°−$\phi_1$, 90°−$\phi_2$ and 90°−$\phi_3$, or 90°+$\phi_1$, 90°+$\phi_2$ and 90°+$\phi_3$. Thus, the technique of the present invention may be utilized to mitigate dispersion whether the birefringent angular orientations of 45°, −21° and 7° (which provide enhanced transmission characteristics) or the angular orientations of 45°, −15°, and 10° (which provide a less desirable transmission characteristics of the prior art) or any other angles are utilized.

It is important to appreciate that, although the improved filter of the present invention has been described herein as utilizing birefringent crystals, other birefringent elements may be utilized to achieve similar effects. For example, polarization beam splitters (PBSs) or polarization beam displacers (PBDs) may be utilized as the polarization selection elements to separate the incoming optical signal into two orthogonally polarized optical beams and to cause the two beams to travel over different optical paths before being recombined. In this manner, the optically path length of each birefringent element may be varied for each polarization.

When birefringent elements other than birefringent crystals are utilized, then the angular orientations thereof necessary to provide the desired dispersion vs. wavelength characteristic curve of the present invention can be converted into relative angles between the optical beam polarization direction and the equivalent fast axes of such devices.

Polarization selection elements other than polarizers may be utilized to effect desired polarization of the signal prior to encountering the birefringent element assembly and upon exiting the birefringent element assembly. For example, polarization beam splitters, (PBSs) or polarization beam displacers (PBDs) may be utilized to effect the desired polarization of the optical signals which are input to and output from the birefringent element assembly. Those skilled in the art will appreciate that various other optical devices are likewise suitable for facilitating such polarization selection functionality.

It is understood that the exemplary dispersion compensating birefringent filter described herein and shown in the drawings represents only presently preferred embodiments of the invention. Indeed, various modifications and additions may be made to such embodiments without departing from the spirit and scope of the invention. For example, those skilled in the art will appreciate the various different configurations of birefringent filters may be utilized according to the present invention. For example, birefringent filters having four, five, six or more elements may similarly be configured so as to mitigate dispersion from either a similar birefringent filter or from any other component. Indeed, two birefringent filters, each having a different number of elements, may be utilized so as to tend to mitigate dispersion from one another. That is, one of the two differently configured birefringent filters may be constructed so to cancel at least a portion of the dispersion contributed by the other birefringent filter.

Thus, these and other modifications and additions may be obvious to those skilled in the art and may implemented to adapt the present invention for use in a variety of different applications.

What is claimed is:

1. A low dispersion interleaver assembly comprising:
   a first interleaver;
   a second interleaver;
   wherein the first interleaver is configured so as to provide a dispersion vs. wavelength curve wherein each dispersion value thereof is approximately opposite in value to a dispersion value at the same wavelength for the second interleaver, so as to mitigate dispersion in the interleaver assembly;
   wherein each interleaver comprises first, second and third birefringent elements;

wherein angular orientations of the first, second and third birefringent elements of the first interleaver are approximately 45°, approximately −21° and approximately 7°, respectively; and wherein angular orientations of the first, second and third birefringent elements of the second interleaver are approximately 45°, approximately −69° and approximately 83°, respectively.

2. A low dispersion interleaver assembly comprising:

a first interleaver;

a second interleaver;

wherein the first interleaver is configured so as to provide a dispersion vs. wavelength curve wherein each dispersion value thereof is approximately opposite in value to a dispersion value at the same wavelength for the second interleaver, so as to mitigate dispersion in the interleaver assembly;

wherein each interleaver comprises first and second birefringent elements;

wherein angular orientation of the first, and second birefringent elements of the first interleaver are approximately 45° and approximately −21°, respectively;

wherein angular orientations of the first, and second birefringent elements of the second interleaver are approximately 135° and approximately 69°, respectively; and the interleaver assembly further comprising a polarization selection element disposed intermediate the first interleaver and the second interleaver such that separate respective oaths are provided with respective transmission versus wavelength responses which are wavelength shifted with respect to each other.

3. A low dispersion interleaver assembly comprising:

a first interleaver;

a second interleaver; wherein the first interleaver is configured so as to provide a dispersion vs. wavelength curve wherein each dispersion value thereof is approximately opposite in value to a dispersion value at the same wavelength for the second interleaver, so as to mitigate dispersion in the interleaver assembly: and wherein the first interleaver comprises a N GHz interleaver and the second interleaver comprises an N/2 GHz interleaver.

* * * * *